UNITED STATES PATENT OFFICE.

CHARLES E. HORE, OF BROOKLYN, NEW YORK.

SOAP COMPOUND.

SPECIFICATION forming part of Letters Patent No. 275,212, dated April 3, 1883.

Application filed March 8, 1883. (No specimens.)

*To all whom it may concern:*

Be it known that I, CHARLES E. HORE, a citizen of the United States, residing at Brooklyn, in the county of Kings and State of New York, have invented new and useful Improvements in Soap Compounds, of which the following is a specification.

This invention relates to a soap compound which contains from ten to twenty per cent. of sulphur, in chemical combination with rosin, oil, and an alkali in such manner that said compound is entirely soluble in water, and also in cresylic or in carbolic acid.

In manufacturing my soap I have found the following proportions to meet the requirements of the invention: I take one hundred pounds sublimed flowers of sulphur, one hundred pounds rosin, and fifty pounds oil, (preferably lard-oil.) These ingredients are mixed together in a kettle and heated to the boiling-point, and the boiling is continued with caution, there being some danger of the mass taking fire. When the mass assumes the form of a bright-red liquor the kettle is withdrawn from the fire and the temperature allowed to run down until there is no foam on the surface of the mass. A solution of one hundred and thirty pounds of caustic soda, or its equivalent of potash, in two hundred and fifty pounds of water is then poured on the molten mass in the kettle, which causes a violent ebullition and disengagement of steam. The mass is stirred well until it goes together, and is returned to the fire for further boiling, which is continued until complete saponification has taken place. At the end of that time the process is completed, and, when the mass has cooled, a transparent deep red-black soap is obtained, which, when dissolved in hot water, shows no free or undissolved sulphur.

In preparing this soap I can replace a part of the rosin and oil (or tallow) with glycerine with equally good results.

In order to prepare from my soluble sulphur-soap a fluid dipping compound for washing sheep and other animals, I add to the mass contained in the kettle, as above stated, about four hundred pounds of cresylic acid, and heat, under agitation, until the mass has dissolved. The resulting solution, when cold, forms a clear, transparent, molasses-like sirup, perfectly soluble in cold water, and showing no free sulphur.

In place of cresylic acid, an equivalent quantity of carbolic acid or equivalent hydrocarbon can be used.

What I claim as new, and desire to secure by Letters Patent, is—

1. The soluble sulphur-soap herein described, which is produced by heating together sulphur, rosin, and oil (or fat) with a solution of a caustic alkali, substantially in the manner hereinbefore set forth.

2. The dipping compound produced by dissolving a quantity of the soluble sulphur-soap hereinbefore described in cresylic or carbolic acid, substantially as set forth.

In testimony whereof I have hereunto set my hand and seal in the presence of two subscribing witnesses.

CHAS. E. HORE. [L. S.]

Witnesses:
 W. HAUFF,
 E. F. KASTENHUBER.